N. McINTYRE.
Lifting-Jack.
No. 202,739. Patented April 23, 1878.
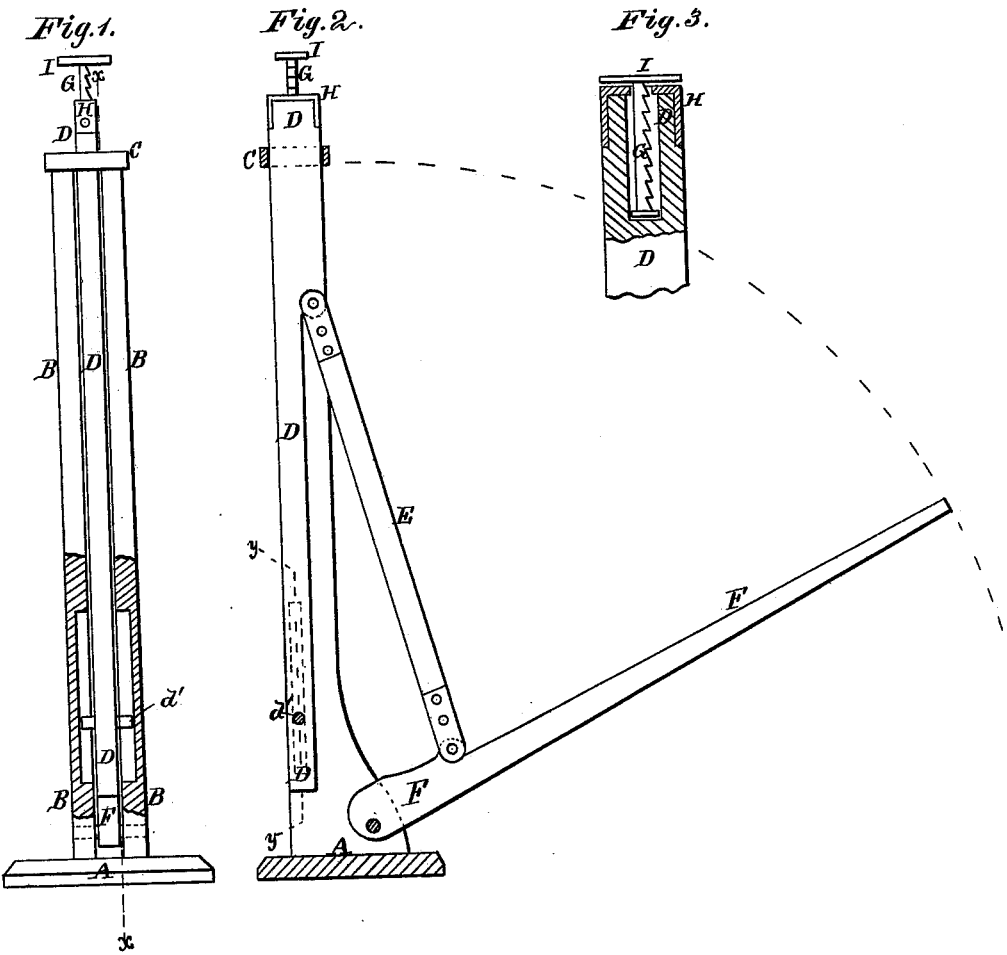
WITNESSES:
Henry N. Miller
C. Sedgwick
INVENTOR:
N. McIntyre
BY Munn & Co
ATTORNEYS.

UNITED STATES PATENT OFFICE.

NELSON McINTYRE, OF PRINCETON, WISCONSIN.

IMPROVEMENT IN LIFTING-JACKS.

Specification forming part of Letters Patent No. 202,739, dated April 23, 1878; application filed February 4, 1878.

*To all whom it may concern:*

Be it known that I, NELSON McINTYRE, of Princeton, in the county of Green Lake and State of Wisconsin, have invented a new and useful Improvement in Lifting-Jacks, of which the following is a specification:

Figure 1 is a rear view of my improved lifting-jack, partly in section, through the line $y\,y$, Fig. 2. Fig. 2 is a vertical section of the same, taken through the line $x\,x$, Fig. 1. Fig. 3 is a detail section of the head of the jack.

Similar letters of reference indicate corresponding parts.

The object of this invention is to furnish an improved lifting or wagon jack for raising the axles of wagons to oil their journals, and for other purposes, which shall be simple in construction and convenient in use, which shall be self-sustaining when the load is raised, and which will close up into compact form for convenience in storage and transportation.

The invention will first be described in connection with the drawing, and then pointed out in the claim.

A is the base of the jack, which is made of such a size as to give it a stable support. To the base A are attached the lower ends of two parallel standards, B, the upper ends of which are connected by a band, C, and which are placed at such a distance apart as to receive the sliding bar D between them. The upper end of the bar D is kept in place by the band C, and its lower end is kept in place by a pin, $d'$, which passes through the said bar D, and its ends slide up and down in grooves in the inner sides of the standards B. The forward part of the sliding bar D is cut away from its lower end nearly to its upper end, and to the shoulder thus formed is pivoted the upper end of the connecting-bar E, the lower end of which is pivoted to the lever F. The lower end of the lever F is pivoted to and between the lower parts of the standards B.

With this construction the sliding bar D is lowered, to place it beneath the axle to be raised, by moving the free end of the lever F downward, and is raised to raise the load by raising the free end of the said lever F. With this construction, as the lever F is raised the connecting-bar E approaches a vertical position, so that the load, when fully raised, will be securely locked in place.

G is a toothed bar, which passes through a short slot in the cap H, attached to the top of the bar D, into a socket formed in the said bar to receive it. The toothed bar G has a small plate attached to its lower end, to keep it from being drawn out and lost, and a larger plate, I, attached to its upper end, for the axle to be raised to rest upon.

The jack can be adjusted to axles of different height by raising or lowering the toothed bar G and turning it one-quarter around, so that one of its teeth may rest upon the cap H.

Having thus described my invention, I claim as new and desire to secure by Letters Patent—

The combination of the toothed bar G, the cap H, and the top-plate I with the upper end of the sliding bar D, substantially as herein shown and described.

NELSON McINTYRE.

Witnesses:
WARREN N. McINTYRE,
MARIA H. McINTYRE.